Nov. 10, 1931.  G. M. CLASS  1,830,981
CHUCK
Filed July 5, 1929  5 Sheets-Sheet 1

Inventor:
George M. Class,
By Fisher, Clapp, Soans & Pond, Attys.

Nov. 10, 1931.   G. M. CLASS   1,830,981
CHUCK
Filed July 5, 1929   5 Sheets-Sheet 2
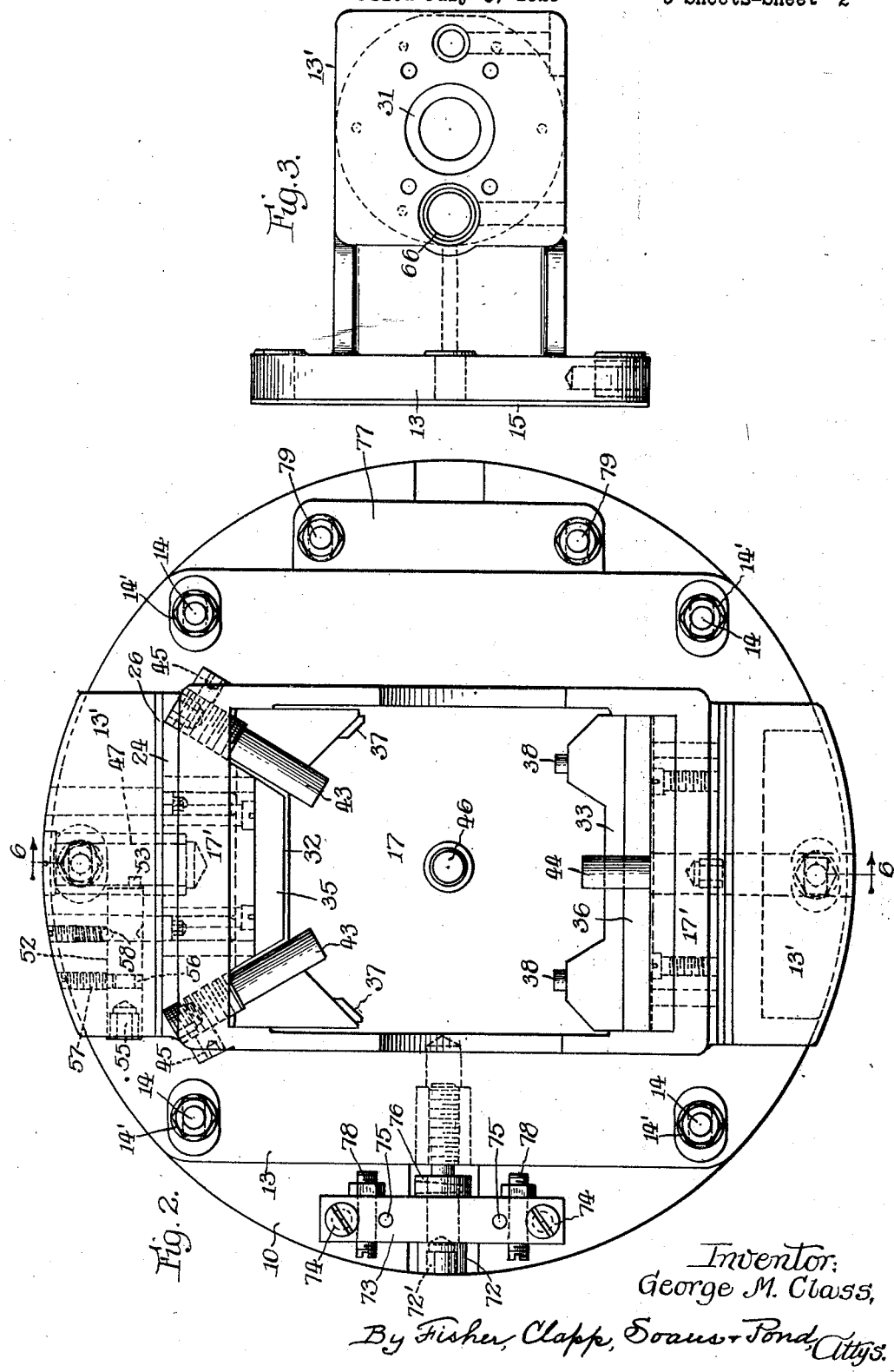
Inventor:
George M. Class,
By Fisher, Clapp, Soans & Pond, Attys.

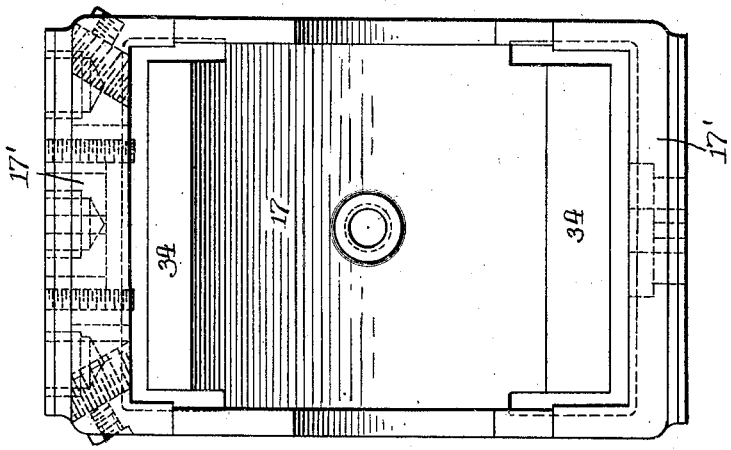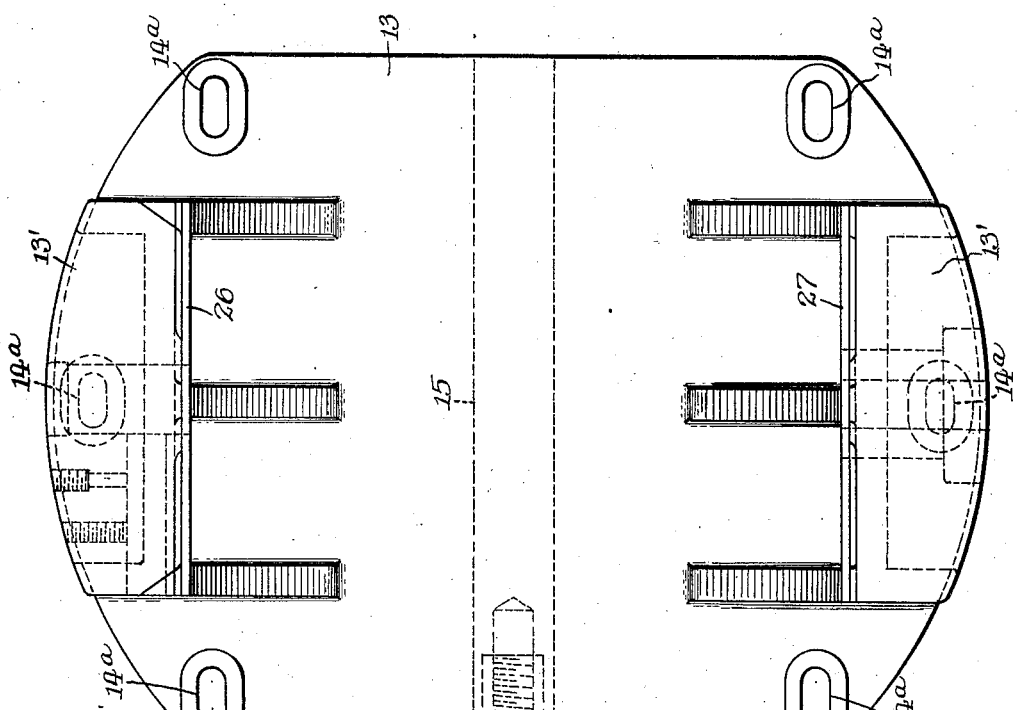

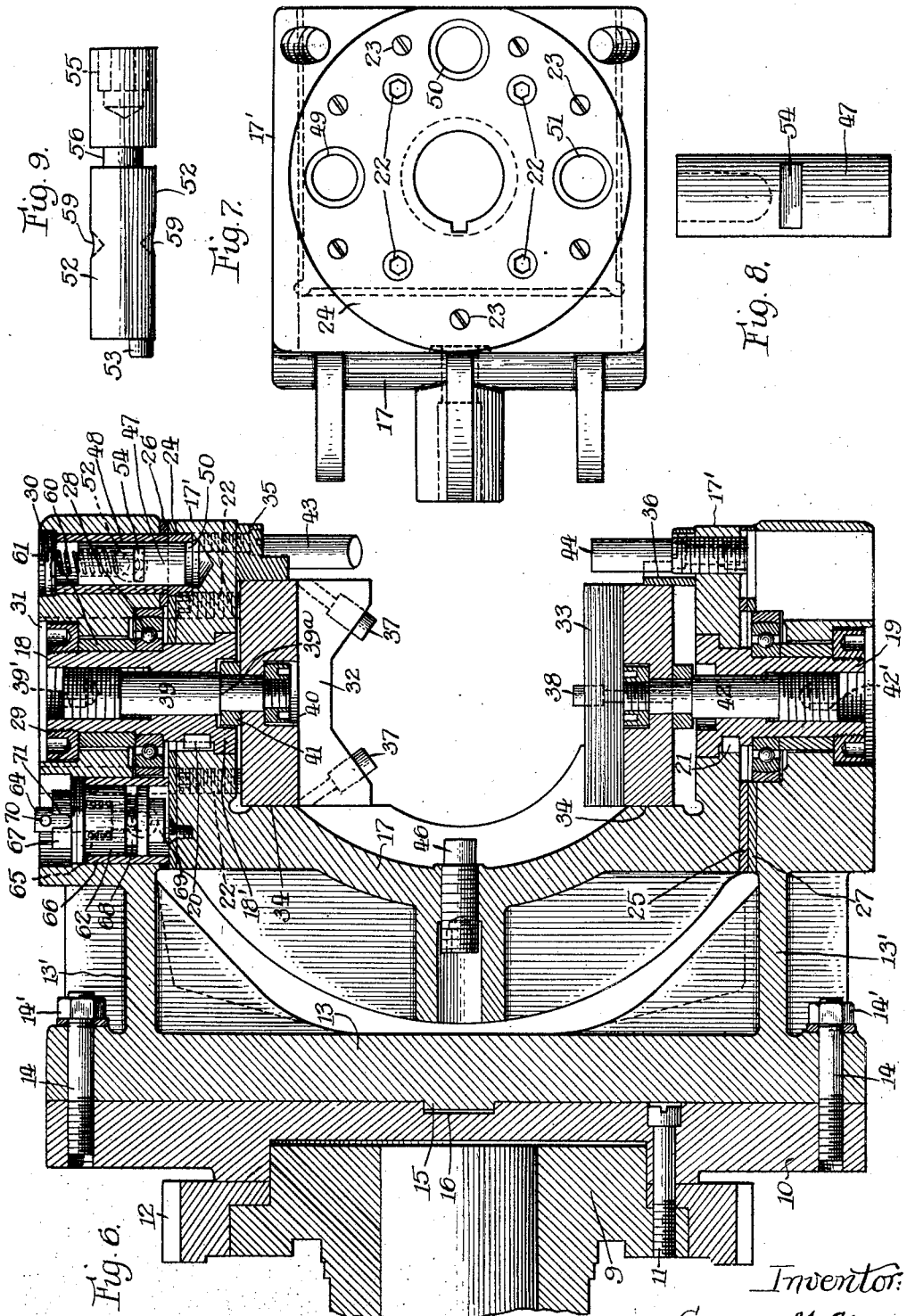

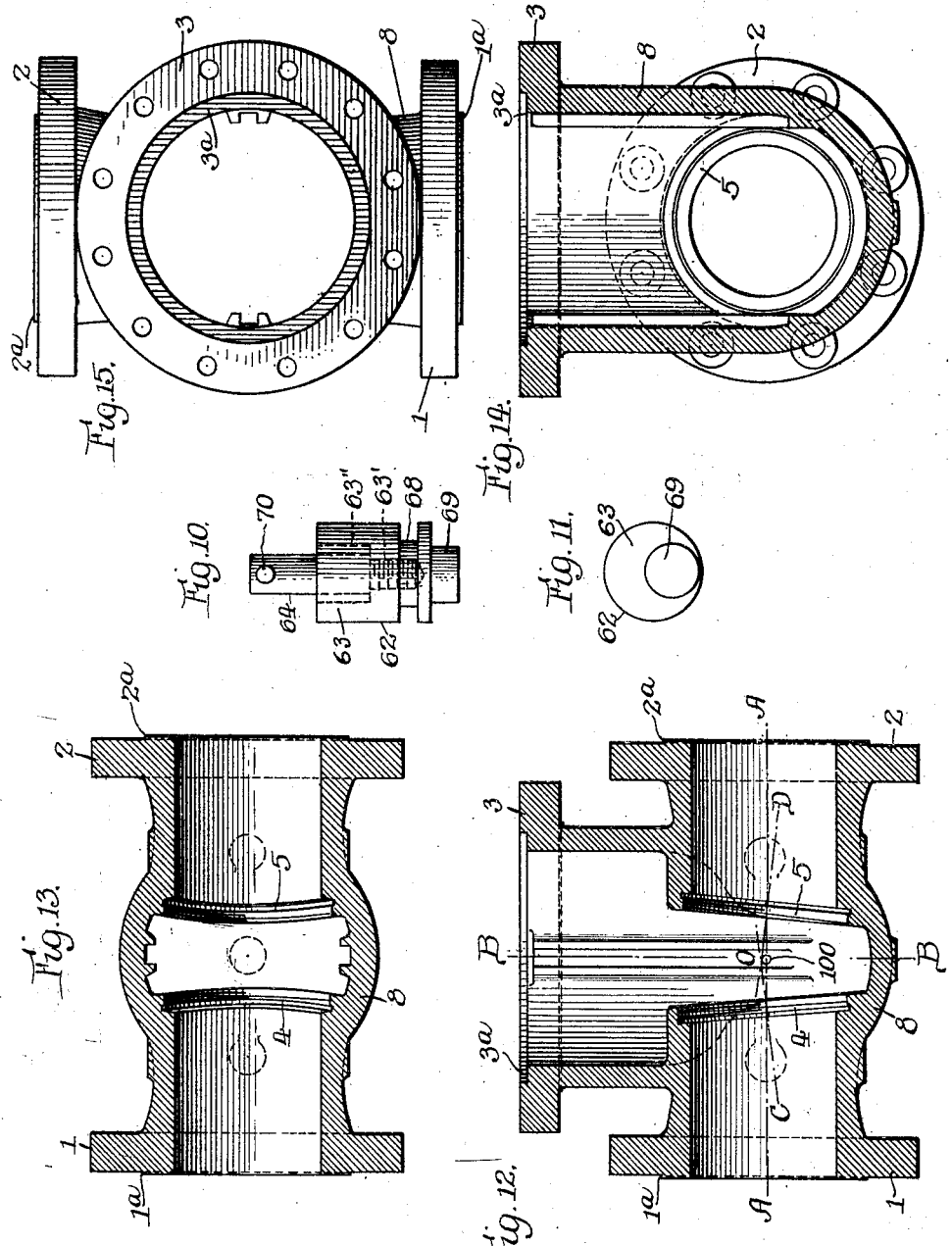

Patented Nov. 10, 1931

1,830,981

UNITED STATES PATENT OFFICE

GEORGE M. CLASS, OF MADISON, WISCONSIN, ASSIGNOR TO GISHOLT MACHINE COMPANY, OF MADISON, WISCONSIN, A CORPORATION OF WISCONSIN

CHUCK

Application filed July 5, 1929. Serial No. 376,077.

This invention relates to the art of work holding chucks for machine tools, and has reference more particularly to a novel design and construction of chuck adapted to receive a casting of a form which requires several machining operations in different planes and at various angular relations to each other.

My present invention relates to that type of chuck which involves a chuck frame and a work gripping member swiveled therein and adapted to be turned to various angular positions and locked therein to the frame, so as to bring different surfaces on the work into a position to be operated upon by the turret or other cutting tools.

Among the objects of the present invention are, to provide a chuck construction of the character above outlined which will permit the various operations to be performed successively on the casting without necessitating its removal or resetting in the gripping jaws. Another object is to provide a chuck construction of the type employing a swiveled work holding member, wherein the gripping jaws of the work holding member may be both adjusted and tightened by means located in the trunnions of the member, so as to be readily accessible to an adjusting and tightening tool. A further object is to provide a construction wherein the gripping pressure of each jaw is from a central point, and the gripping pressures of the two jaws act on the body to be gripped in opposite radial directions. Still another object is to provide improved means for locking the work carrier to the frame of the chuck; and a further object is to provide an improved construction which will permit of a bodily adjustment of the chuck frame and its swiveled work carrier so as to insure a correct position of the work in relation to the axis of the spindle of the chuck and the cutting or boring tool.

Still other objects and attendant advantages of the invention will be apparent to persons skilled in the art from the following detailed description, when taken in connection with the accompanying drawings in which I have illustrated a practical embodiment of the invention, and the manner in which the same functions for the performance of machining operations upon the body casting of a standard gate valve of well known construction, which requires machine operations of turning and boring in different planes and at various angular relations to each other.

Referring to the drawings—

Fig. 2 is a face view of the chuck.

Fig. 3 is a top plan view of the chuck frame.

Fig. 4 is a face view of the chuck frame.

Fig. 5 is a face view of the cradle, with the work-gripping jaws omitted.

Fig. 6 is a vertical cross section taken on the line 6—6 of Fig. 2.

Fig. 7 is a top plan view of the cradle.

Fig. 8 is an elevational detail of a locking pin for locking the cradle in each of a plurality of quadrant positions.

Fig. 9 is an elevational detail of the locking pin actuator.

Fig. 10 is an elevational detail of an eccentric locking pin used to lock the cradle in positions slightly offset from quadrant positions.

Fig. 11 is an end elevation of Fig. 10 viewed from the bottom of the latter figure.

Fig. 12 is an axial section of the gate valve casting illustrated in Fig. 1.

Fig. 13 is an axial section of the same casting in a plane at right angles to that of Fig. 12 and looking downwardly.

Fig. 14 is a central vertical section of the same casting.

Fig. 15 is a top plan of Fig. 14.

Figure 1:
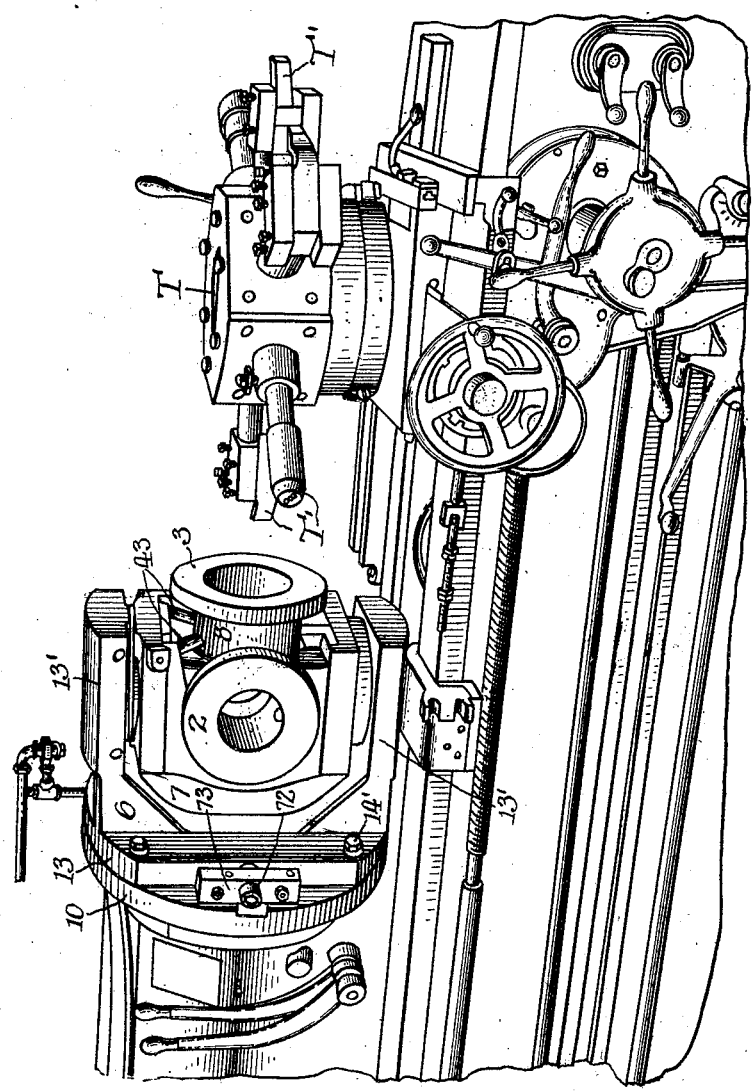
Fig. 1 is a perspective elevation of a portion of a turret lathe, showing my improved chuck and a standard gate valve casting mounted therein.

A form of valve casting which I have selected to illustrate the mode of operation of my improved chuck is shown in Figs. 12 to 15 inclusive. The construction of this valve requires that two interior recesses be bored and threaded as shown at 4 and 5. These recesses receive bronze rings correspondingly threaded which form seats for the wedge-shaped slide or gate that is commonly employed in valves of this type. The axes of these recesses are indicated by the lines O—C and O—D, and it will be observed that they form angles of about five degrees with the axis A—A of the two oppositely disposed arms of the casting. The several machining operations to be performed on this valve body casting are as follows. The flanges 1 and 2 are to be faced, and the shoulders 1ª and 2ª turned thereon; the flange 3 is to be faced, and the shallow depression 3ª bored therein; and the two recesses 4 and 5 are to be bored and threaded, as indicated.

The chuck consists of two main units,—the body or frame unit designated as an entirety by 6 in Fig. 1, and the cradle unit designated as an entirety by 7. The valve body casting above described in connection with Figs. 12—15, and designated as an entirety by 8 in Fig. 1 is secured in this cradle unit by means of suitable gripping jaws. The cradle unit is provided with trunnions that are journaled in the frame unit 6 in such a way that it may be turned to present the different portions of the valve casting for engagement by the tools T' of the turret T. In Fig. 1, the cradle unit is shown set in a position where the flange 3 of the valve casting is in position for the machining operation.

Fig. 2 shows the chuck in face view, and Fig. 6 is a central vertical cross section of the same. In Fig. 6 the manner of attaching the chuck to the nose 9 of the lathe spindle is shown, a face plate 10 being fitted to the spindle nose and secured thereto by means of screws, one of which is shown at 11. A gear wheel 12 is mounted on a flanged portion of the spindle nose, and this gear, in cooperation with other gears (not shown) serves to transmit motion to the spindle from the source of power in a well known manner.

The body or frame unit 6 of the chuck comprises in general a back plate 13, and upper and lower forwardly extending arms 13' preferably integral therewith. This frame unit is secured to the face plate 10 by means of clamping nuts 14' on a group of threaded studs 14 anchored in the face plate 10. The arms 13' of the frame member are bored to provide bearings for the trunnion members of the cradle unit hereinafter described.

By reference to Fig. 4 it will be observed that the holes 14ª in the frame plate 13 through which the studs 14 pass are made oblong to allow for a limited cross movement of the chuck frame on the spindle nose, for a purpose hereinafter described. A tongue 15 on the back of the frame plate 13 slidably fits a groove 16 in the face plate 10, and serves as a guide for the frame unit in its transverse movement.

The cradle unit 7 comprises generally, a back plate 17 and upper and lower integral forwardly extending arms 17'. This cradle unit is shown in face elevation in Fig. 5, and in top plan in Fig. 7. The two arms 17' of the cradle unit are bored to receive hollow trunnions 18 and 19. Keys 20 and 21 fit recesses in the trunnions and keyways in the bores to prevent turning of the trunnions therein. Four headless screws 22 are mounted in the upper arm 17' for a purpose later described.

To the top surface of the upper arm 17' is attached by flat head screws 23, a thin plate 24, and a similar plate 25 is secured by similar means to the bottom surface of the lower arm 17'.

A circular plate 26 is secured to the under surface of the upper arm 13' of the chuck frame member; and a plate 27 is secured to the upper surface of the lower arm 13' of the chuck frame member, the plate 27 being a duplicate of the plate 26. By reference to Fig. 6 it will be seen that the cradle unit is nested between the arms of the chuck frame unit with the above described plates in contact with each other, the purpose of these plates being to provide good wearing surfaces.

Referring further to Fig. 6, it will be seen that the enlarged lower end of trunnion 18 closely fits the bore in the upper arm 17' of the cradle unit and has a flange 18' on its lower end fitting a counter bore in the arm which prevents the trunnion from moving outwardly. An anti-friction bearing 28 suitably mounted in the bore of the arm 13' supports the trunnion laterally, and on the upper end of the trunnion is a nut 29 provided with holes to receive a spanner wrench for tightening the same. Interposed between this nut and the ball bearing 28 is a collar 30, by which the inner race of the ball bearing is held securely in place on the trunnion, the outer race of the ball bearing fitting a counter bore in the arm 13'. The nut 29 occupies a counter bore 31 in the upper side of the arm 13', the depth of which is such that when the nut 29 is tightened down, the flange 18' on the lower end of the trunnion will be drawn just into contact with the bottom of the lower counter bore in the arm 17' of the cradle unit. The collar 30 is made smaller in diameter than the main bore in the frame arm, so that there will be a clearance space.

The lower trunnion 19 is fitted in the lower arm 17' of the cradle unit in exactly the same manner as the trunnion 18 is fitted in the upper arm of the cradle unit, and it is journaled in the lower arm 13' of the chuck frame member in the same manner that the upper trunnion 18 is journaled in the upper arm of the chuck frame member.

For gripping the valve body casting, upper and lower jaws 32 and 33 are provided, the upper jaw 32 being known as the fixed jaw (although adjustable toward and from the spindle axis) and the lower jaw being known as the movable jaw, being movable into and out of gripping engagement with the work. These jaws slidingly fit in transverse channels formed between shoulders 34 on the back plate 17 of the cradle unit and retaining plates 35 and 36 which are secured to the arms 17' of the cradle unit. The fixed jaw 32 is equipped with four studs 37, which contact with the spherical surface of the valve casting. These studs are radially disposed when viewed from the side of the chuck, as in Fig. 6, but vertically disposed when viewed from the face of the chuck, as in Fig. 2, their lower ends being bevelled as shown in Fig. 2 to present surfaces normal to the spherical surface of the valve casting. The lower jaw 33 is provided with two studs 38 so positioned that their end surfaces will contact with a pair of flat surfaced bosses on the valve casting that are indicated by dotted lines in Fig. 12.

The upper jaw 32 is bedded against the four screws 22, above mentioned. These set screws 22 enable the position of the jaw to be adjusted so that the valve casting, when clamped against the studs 37, will rest with its axis coinciding with the axis of the lathe spindle. When the adjustment has been made, the jaw is held rigidly bedded against the screws 22 by means of a clamping screw 39. The upper end of this screw is threaded in the trunnion 18, as shown in Fig. 6, and is provided with a socket 39' of hexagonal form to receive a suitable wrench by which it may be turned. The lower end of the screw is fitted in a counter sunk central bore in the jaw 32 in the manner of a swivel. A nut 40 forms a shoulder on screw 39 to draw the jaw tightly against the set screws 22. A collar 41 fits between the upper surface of the jaw and a shoulder 39ª on the screw.

The lower movable jaw 33 is actuated into and out of gripping engagement with the work by a screw 42 similar to the locking screw 39, swiveled in the central bore of jaw 33 in the same manner that the locking screw 39 is swiveled in the fixed jaw 32. Screw 42 is threaded in the trunnion 19 and is provided with a hexagonal socket 42' to receive a wrench. As above stated, however, the function of screw 42 is different from that of screw 39 in that it is utilized to actuate the jaw 33 toward the valve body and firmly grip the same between the studs 38 in this jaw and the studs 37 in the upper jaw.

In order to positively locate the axis A—A (Fig. 12) of the valve body in the axis of the lathe spindle, and to prevent any danger of displacement under heavy cuts, a pair of downwardly and inwardly inclined work gripping studs 43 are mounted in the upper arm 17' of the cradle unit opposite the outer side of the upper jaw 32, and a single central gripping stud 44 vertically disposed is mounted in the lower arm 17' of the cradle unit opposite the outer side of the lower jaw 33. These studs project inwardly in a radial direction so that their ends will be normal to the surface of the cylindrical portion of the valve casting in rear of the flange 3. The outer ends of these studs are threaded in the arms of the cradle unit, and are provided with sockets to receive a wrench so that they may be adjusted to suit the casting and bring the axis thereof exactly true. In order to insure permanency of the adjustment of studs 43, locking screws 45 are provided. The stud 44 is threaded in the lower arm of the cradle unit, and by means of a suitable wrench it may be brought to bear against the casting and force it tightly against the studs 43.

Referring to Fig. 6 a set screw 46, which is provided with a hexagonal socket in its outer end to receive a wrench, is threaded in the back plate 17 of the cradle unit. This screw is advanced to bear against the valve casting after the latter has been gripped in the jaws, and its purpose is to provide a rigid back support against the pressure of the cutting tool.

From the foregoing it will be seen that the gripping pressure of the jaws is endwise against the trunnions, so that the valve casting may be held rigidly in the cradle unit, but the latter is free to be turned on the trunnions to bring any of the several axes of the work into the axis of the lathe spindle.

The cradle unit is securely locked to the chuck frame in each of the three required quadrant positions for machining the flange faces 1, 2 and 3, by means of a locking pin 47, a detail of which is shown in Fig. 8. This pin is slidably fitted in a bushing 48 which is forced into a hole bored in the upper arm 13' of the chuck frame, as shown in Fig. 6. Referring to Fig. 7, three bushed holes 49, 50 and 51 are provided in the upper arm 17' of the cradle, the same being angularly spaced 90° apart and at exactly the same radial distance from the axis of the trunnion 18. The locking pin 47 is moved into, or retracted from, the hole 50 by means of a shaft 52, shown in detail in Fig. 9, that is journaled in the arm 13' and has on its inner end an eccentric pin 53 which engages a transverse slot 54 milled in the side of the locking pin. The operating shaft 52 is provided at its outer end with a wrench socket 55. An annular groove 56 in said shaft is entered by the reduced end of a screw 57 (Fig. 2) in order to hold it in place. In the position shown in Fig. 6, the pin 53 is in position to hold the locking pin 47 in cradle engaging positon. By turning the shaft 52 180° the locking pin 47 will be withdrawn from the hole 50, and this will permit the cradle to be turned on its trunnions to either one of the positions where holes 49 or 51 will register with the pin. Then by returning the shaft to the position shown, the cradle unit will be locked in its operating position. The shaft 52 is locked against accidental turning by means of a spring pressed ball 58 (Fig. 2) which engages either of two oppositely disposed conical depressions 59 (Fig. 9) in shaft 52.

For convenience in locating the cradle unit in its different operating positions, it is desirable that the locking pin 47 snap into place when one of the holes 49, 50 and 51 is brought into register with it. To accomplish this result the pin 47 is made hollow, as shown in Fig. 6, and a coil spring 60 is placed therein, the outer end of said spring being footed against a threaded plug 61 screwed into the upper end of the bushed hole which receives the locking pin. Thus the locking pin is pressed by the spring 60 against wear plate 24, and when the shaft 50 is given a partial turn, it will automatically enter one of the holes 49, 50, 51 when brought into register with it.

When the face 3 of the valve casting is in position for machining, as shown in Fig. 1, locking pin 47 is engaged with hole 50 in the cradle unit. The holes 49 and 51, being each 90° from hole 50 and 180° apart, the valve casting will be in correct position for machining either face 1 or face 2 when the locking pin is in one of these holes.

For performing the boring and threading operations on the recesses 4 and 5, the cradle unit must be turned to a position at a slight angle from the position obtained with the locking pin 47 in the holes 49 and 51. As shown in Fig. 12, the recesses are bored on an axis that is at a slight angle, in the plane of the section (Fig. 12), with the axis A—A. In the particular valve shown, the angle is 5°. In order to lock the cradle unit in these two required angular positions, an auxiliary locking pin designated as an entirety by 62 is provided. This pin, as shown in Figs. 10 and 11, comprises a body member 63 and a stem 64, the latter being screwed in a counter bored depression 63' in the body member, forming an annular space 63'' around it to receive a coil spring 65. The body portion 63 slidably fits a bushing 66 which is tightly fitted in a hole in the upper arm 13' of the chuck frame, and the upper end of this hole is threaded to receive a cap 67, said cap being centrally apertured to encircle stem 64. The body 63 may be raised and lowered in the bushing 66 by means of a shaft with an eccentric portion, which is identical with the shaft 52, above described, and operates in the same manner by engaging with an annular groove 68 in the body 63. On the inner end of the auxiliary locking pin is a stud 69, the axis of which is eccentric to the axis of the locking pin, said stud being of a diameter to fit any of the holes 49, 50 and 51 in the cradle arm.

The stem 64 of the locking pin is provided with a cross pin 70 which lies in the common plane of the axes of the body 63 and the stud 69. This pin 70 registers with a slot 71 in the cap 67, this slot being positioned transversely to the plane of the section of Fig. 6. The locking pin 62 in this figure is shown in raised position, in which position the cross pin 70 is clear of the slot 71. In this position the locking pin may be rotated to either of the two positions, 180° apart in which the cross pin will, when lowered, enter the slot 71; and when the locking pin is in the raised position shown, its locking stud 69 will be clear of the wear plate 24 on the cradle arm.

This auxiliary locking pin 62 is so located that its axis will lie at an angular distance from the locking pin 47 which is an integer or a multiple of the angular distance between the locking holes 49, 50 and 51. In the instance shown, the locking holes are 90° apart, and the auxiliary locking pin is located 180° from the main locking pin 47. The auxiliary locking pin 62 is also so located that its eccentric stud 69 will register with either of the holes 49 or 51 when the cradle unit is turned to bring them into engaging position. When this pin is employed for locking the cradle, the other locking pin 47 must, of course, be lifted and held in raised position.

The extent of the eccentricity of the stud 69 on the locking pin 62 is such that when engaging one of the holes 49 or 51 the cradle will be turned (in the case of the particular valve here shown) 5° from the position it would occupy with the pin 47 in place. By raising the pin 62 and turning it to either of its two diametrically opposed positions, the cradle may be set and locked 5° either way from the position determined by the pin 47, thus shifting the axis A—A (Fig. 12) to the proper angle for performing the boring and threading operations in either one of the recesses 4 and 5; this being accomplished without the necessity of providing any extra or additional locking holes in the cradle unit other than those required for performing the facing operations at even quadrant distances apart.

The nature of the machining operations to be performed on the recesses depends, of course, upon the design of the valve; but in this case the first is a boring operation performed by a tool with a single cutter, the lathe in this case being provided with a cross sliding turret, enabling the tool to be moved to clear the interior walls of the casting while entering the chamber into cutting position. The threading operation is performed with a collapsible tap that may be expanded after being brought into cutting position.

Referring to Fig. 12 it will be noticed that the axes O—C and O—D of the recesses 4 and 5 cross the axis A—A substantially at the intersections of the latter with the bottom surface of the recesses. The axis of the cradle trunnions lies in the plane of the lathe spindle axis; and therefore, when the cradle unit is turned to a position determined by the locking pin 62, thus throwing the axis A—A to an angle with the spindle axis, the axis of one of the recesses will be parallel to the spindle axis, but offset therefrom a slight amount equal to the radius of the small circle 100 (Fig. 12) which is drawn tangent to the axes O—C and O—D. It is, therefore, necessary that the axis of the recess be shifted by this amount in a plane perpendicular to the axis of the trunnions when the boring and threading operations are to be performed on the recesses.

This shifting of the axis of the recess to be bored is accomplished by sliding the chuck frame on the spindle face plate 10. As previously explained, the movement of the chuck frame is guided on the face plate in a transverse direction by means of the tongue 15 sliding in the groove 16 (Fig. 6). Freedom for the limited extent of sliding movement of the chuck frame on the face plate is provided for by the elongated holes 14ᵃ (Fig. 4) through which the clamping studs 14 pass.

The sliding movement of the chuck frame on the face plate is effected by turning a screw 72 (Fig. 2), which is provided with a wrench socket 72′ in its outer end. This screw is threaded into one vertical edge of the back plate 13 of the chuck frame, as shown in Fig. 2, and its shank is journaled in a bar 73 that is secured rigidly to the face plate 10 by means of cap screws 74 and dowel pins 75. A shoulder at the head of the screw 72 takes the end thrust in one direction and a collar 76 pinned thereto takes the thrust in the other direction.

The limits of the transverse movement of the chuck frame on the face plate are determined by the adjustment of a stop plate 77 (Fig. 2) and two adjustable stop screws 78 mounted in the bar 73. Stop plate 77 is held rigidly to the face plate by means of nuts on studs 79, the plate being adjustable thereon a limited amount by reason of the holes in the stop 77 through which the studs pass being elongated. The stop plate 77 is so adjusted that, with the back plate of the chuck frame contacting with it, as shown in Fig. 2, the axis through the trunnions intersects the lathe spindle axis. In this position the axis A—A or B—B (Fig. 12) of the valve casting will coincide with the spindle axis when the locating and locking pin 47 is in any of the engaged positions.

The stop screws 78 are so adjusted that when the chuck frame is moved to the left into contact with them, the axis of the recess 4 or recess 5 in the valve will be brought into coincidence with the spindle axis. This adjustment is, of course, dependent on the radius of the circle 100 (Fig. 12) and varies with the design of the valve.

Although the application of this device to a turret lathe is here disclosed, it may also be applied to other machines for planing, milling, or drilling operations. The form of face plate to which the body member is attached may of course be varied to suit the particular machine to which it may be attached.

In the foregoing, I have fully described the underlying principles of my improved chuck, and one practical and improved embodiment thereof; but it is manifest that the details of structure and arrangement may be considerably varied from those shown without departing from the essence of the invention, or sacrificnig any of the advantages. Hence, I do not limit the invention to the particular embodiment presented for purposes of illustration, but reserve such variations and modifications as fall within the spirit and purview of the claims.

I claim:

1. In a chuck of the type described, the combination of a chuck frame comprising a back plate attachable to the chuck spindle and a pair of forwardly extending arms, a cradle comprising a back plate and a pair of forwardly extending arms nested in said chuck frame, trunnions by which the arms of said cradle are pivoted to the arms of said chuck frame, opposed jaws slidably mounted in said cradle arms, means for moving said jaws toward and from the work, and work-locating studs adjustably mounted in the arms of said cradle independently of said jaws adapted to preliminarily locate the axis of the work in the axis of the lathe spindle, and to prevent displacement of the work under heavy cuts.

2. In a chuck of the type described, the combination of a chuck frame, a crade swiveled in said chuck frame, and means for locking said cradle in either of two different angular positions relatively to said chuck frame, said locking means comprising a hole in one of said parts, a rotatable locking pin slidably mounted in the other part formed with an eccentric stud engageable with said hole, and means for locking said pin against turning when engaged with said hole.

3. In a chuck of the type described, the combination of a chuck frame attachable to the chuck spindle and formed with a pair of forwardly extending arms, a cradle formed with a pair of forwardly extending arms nested in said chuck frame, trunnions by which the arms of said cradle are swiveled in the arms of said chuck frame, and means for locking said cradle in varying angular positions relatively to said chuck frame, said locking means comprising a group of equally spaced holes in an arm of said cradle at equal radial distances from the axis of said trunnions, a rotatable locking pin slidably mounted in the opposed arm of said chuck frame and formed with an eccentric boss engageable with any of said holes, and means for locking said pin against turning when engaged with any of said holes.

4. In a chuck of the type described, the combination of a chuck frame, a cradle swiveled in said chuck frame, and means for locking said cradle in varying angular positions relatively to said chuck frame, said locking means comprising a group of equally spaced holes in one of said parts at equal radial distances from the axis of the cradle, a locking pin slidably mounted in the other part engageable with said holes, and a rotatable auxiliary locking pin formed with an eccentric stud engageable with said holes.

5. In a chuck of the type described, the combination of a chuck frame attachable to the chuck spindle and formed with a pair of forwardly extending arms, a cradle formed with a pair of forwardly extending arms nested in said chuck frame, trunnions by which the arms of said cradle are swiveled in the arms of said chuck frame, and means for locking said cradle in varying angular positions relatively to said chuck frame, said locking means comprising a group of equally spaced holes in an arm of said cradle at equal radial distances from the axis of said trunnions, a locking pin slidably mounted in the opposed arm of said chuck frame, and a rotatable auxiliary locking pin slidably mounted in said opposed arm at a point diametrically opposite said first-named locking pin with reference to the trunnion axis, said auxiliary locking pin having an eccentric boss engageable with any of said holes.

GEORGE M. CLASS.